United States Patent [19]

Arnold et al.

[11] 4,105,973
[45] Aug. 8, 1978

[54] MULTIBEAM, DIGITALLY MODULATED, TIME DIVISION, SWITCHED SATELLITE COMMUNICATIONS SYSTEM

[75] Inventors: Hamilton Webster Arnold, Tinton Falls; LeRoy Conrad Tillotson, Harrison, both of N.J.; James Arthur Young, Jr., Brazilia, Brazil

[73] Assignee: Bell Telephone Laboratories, Incorporated, Murray Hill, N.J.

[21] Appl. No.: 732,994

[22] Filed: Oct. 15, 1976

[51] Int. Cl.² ........................................... H04B 7/20
[52] U.S. Cl. ................................... 325/4; 179/15 BS
[58] Field of Search ....................... 325/4, 14, 42; 343/100 CS, 100 AD, 100 ST, 117 R; 179/15 BS; 178/69.1

[56] References Cited

U.S. PATENT DOCUMENTS

| | | | |
|---|---|---|---|
| 3,406,401 | 10/1958 | Tillotson | 343/100 |
| 3,530,252 | 9/1970 | Puente | 179/15 |
| 3,711,855 | 1/1973 | Schmidt et al. | 343/100 |
| 3,818,453 | 6/1974 | Schmidt et al. | 340/172.5 |
| 3,835,253 | 9/1974 | Bond | 178/69.5 |
| 3,839,599 | 10/1974 | Pitroda | 178/69.5 |
| 3,842,350 | 10/1974 | Gross | 325/4 |
| 3,858,007 | 12/1974 | Ganssmantel | 179/15 |
| 3,928,804 | 12/1975 | Schmidt et al. | 325/4 |
| 3,942,115 | 3/1976 | Wolejsza, Jr. | 325/4 |
| 3,958,083 | 5/1976 | Hara et al. | 178/69.5 |

Primary Examiner—Benedict V. Safourek
Attorney, Agent, or Firm—Erwin W. Pfeifle

[57] ABSTRACT

The present invention relates to a multibeam, digitally modulated, time division switched communication system especially for use with a satellite repeater wherein separate up-link and down-link signals are transmitted between each of a plurality of ground station areas and the repeater using space diversity techniques. The frequency band of each up-link signal is split to include at least two frequency multiplexed channels, each channel being separated at the repeater and independently switched at baseband frequencies through a repeater switching network comprising at least two matrix switches for retransmission on the appropriate down-link signal. Synchronizing and clock recovery procedures are used to enable both the clock at each ground terminal station within each ground station area to be synchronized with a master clock at the repeater, and the corresponding bits and subframes within an information frame to arrive in synchronism at the repeater to permit simultaneous switching of all up-link channels through the repeater switching network. The repeater switching network is controlled from the ground terminal stations by control signals included in each up-link subframe, the control signals determining for its associated down-link channel which synchronized up-link channel from another ground station area is to be connected to the associated down-link channel.

18 Claims, 10 Drawing Figures

FIG. 8
CLOCK SET MESSAGE

FIG. 9
SUBFRAME SYNCHRONIZING MESSAGE

FIG. 10

MULTIBEAM, DIGITALLY MODULATED, TIME DIVISION, SWITCHED SATELLITE COMMUNICATIONS SYSTEM

BACKGROUND OF THE INVENTION (1) Field of the Invention

The present invention relates to a multibeam, digitally-modulated, time division switched communication system especially for use with satellite repeaters, and more particularly to method and apparatus for synchronizing and concurrently switching a plurality of digitally-modulated signals at the repeater.

(2) Description of the Prior Art

Where several ground terminal stations transmit signals through a satellite repeater, conventional communication systems employ either frequency division multiplexing techniques where multiple transponders and a global-coverage antenna are used in the satellite, or time division multiple access/space division multiple access (TDMA/SDMA) techniques where multiple transmit/-receive spotbeam antennas are used at the satellite. The latter technique advantageously permits the same frequency band to be used between some or all of the ground stations and the satellite. In prior art TDMA/SDMA systems, several earth stations within a limited geographical zone sequentially access the same spotbeam antenna in a time divided manner. Typically, each such antenna communicates with a different geographical zone on the earth's surface. Additionally, the satellite contains a switching matrix which interconnects antennas into pairs for specified intervals and according to a preestablished sequence so that information may flow from a transmitting earth station in view of one antenna to a receiving earth station in view of another antenna. In this regard see, for instance, U.S. Pat. Nos. 3,711,855 issued to W. G. Schmidt on Jan. 16, 1973, and 3,928,804 issued to W. G. Schmidt et al on Dec. 23, 1975.

In satellite communication systems employing TDMA, the various ground stations must be synchronized to permit the sequentially transmitted pulse bursts to arrive at the satellite at the allocated time periods. Various synchronization techniques have been used. For example, in U.S. Pat. No. 3,530,252 issued to J. G. Puente on Sept. 22, 1970 a synchronizing method is disclosed where a low power accessing pulse is continuously transmitted from each station to the satellite. When the corresponding pulse is returned to the station, its position in the satellite time frame is observed and the phase varied until the access pulse appears at the beginning of the time slot assigned to that station. Alternatively, it is known to transmit a reference synchronizing signal from the satellite which is compared at each station with that station's own signal returning from the satellite. In this regard see, for instance, U.S. Pat. Nos. 3,646,444 issued to W. Bitzer on Feb. 29, 1972, and 3,858,007 issued to H. Ganssmantel on Dec. 31, 1974.

The problem remaining, however, is to provide a satellite repeater in a multibeam, digitally-modulated, time division switched communication system which has increased versatility and reliability while achieving increased switching therethrough with minimal on-board control.

BRIEF SUMMARY OF THE INVENTION

The present invention relates to a multibeam, digitally-modulated, time division switched communication system especially for use with satellite repeaters, and more particularly to method and apparatus for synchronizing and concurrently switching a plurality of digitally-modulated signals received at the repeater for retransmission to the appropriate terminal stations.

It is an aspect of the present invention to provide method and apparatus for synchronizing a plurality of spotbeam signals emanating from a similar plurality of ground terminal areas for simultaneous arrival at the satellite repeater. Each spotbeam signal comprises at least two frequency multiplexed, radio frequency (r-f) channels having multiple digitally-modulated information subframes which are transmitted from one or more terminal stations within a ground terminal area. Additionally, the satellite repeater simultaneously switches each of the digitally-modulated information subframes for proper retransmission to the applicable ground terminal area.

It is another aspect of the present invention to provide method and apparatus which cause a particular digitally-modulated information subframe which does not arrive in synchronism with the corresponding information subframes of the other spotbeams to be retransmitted to the ground terminal area wherefrom it originated.

It is still another aspect of the present invention to provide a switching arrangement in the satellite repeater which produces greater reliability by providing a separate path through the switching matrix for each of the r-f channels within a spotbeam signal.

Other and further aspects of the present invention will become apparent during the course of the following description and by reference to the accompanying drawings.

BRIEF DESCRIPTION OF THE DRAWINGS

Referring now to the drawings, in which like numerals represent like parts in the several views.

DETAILED DESCRIPTION

The present invention has been described primarily in terms of a multibeam, digitally modulated, time division switched satellite communication system employing pulse code modulation (PCM) for encoding the information being transmitted between 16 ground station areas and the satellite repeater. It will, however, be understood that such description is exemplary only and is for purposes of exposition and not for purposes of limitation. It will be readily appreciated that the inventive concept described is equally applicable to (a) information content other than in the PCM format such as, for example, that used with subscriber loop multiplexing or digital data systems, (b) a number other than 16 ground station areas, and (c) a system using a land based repeater rather than an orbital satellite.

Figure 1:
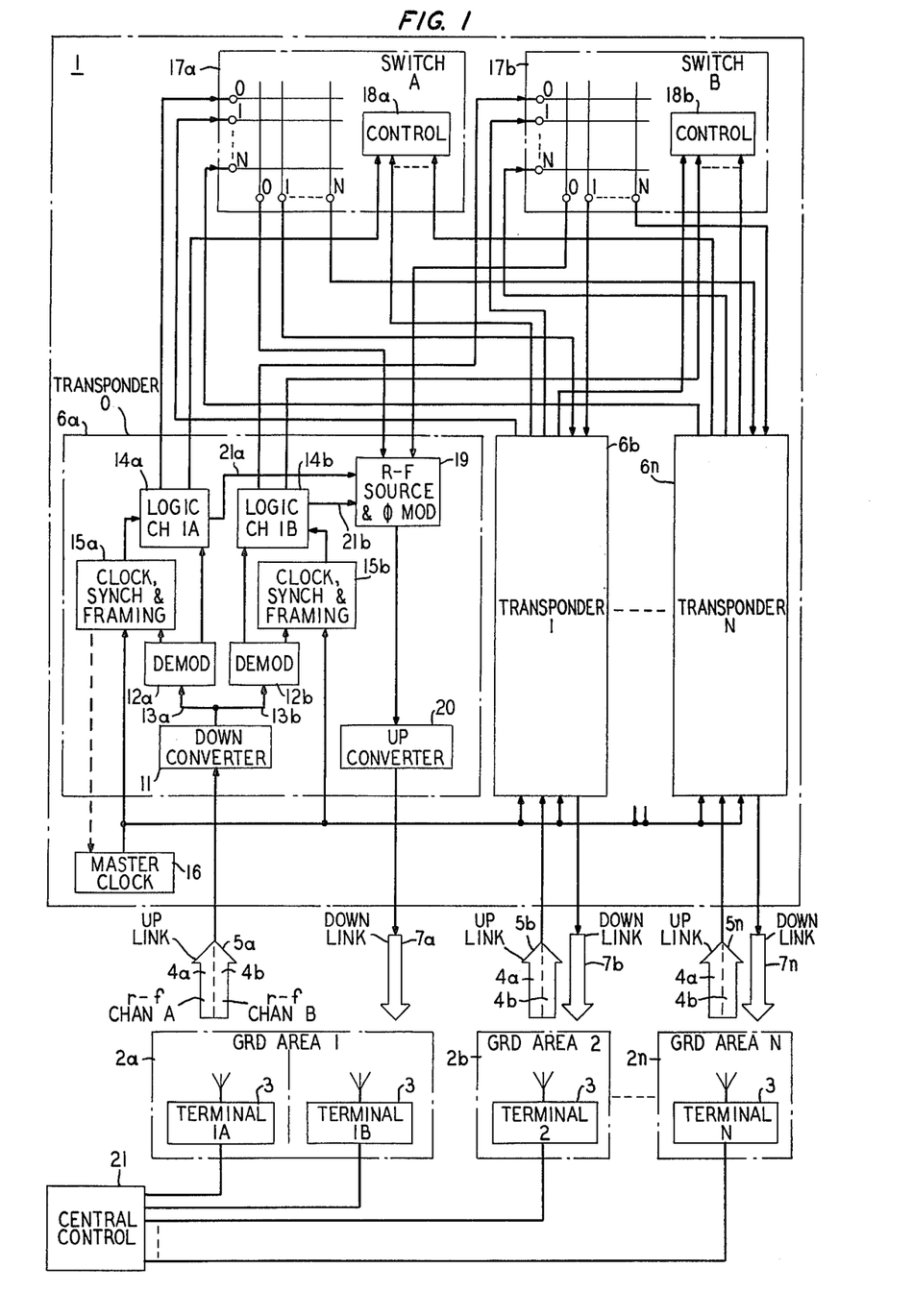
FIG. 1 is a schematic block diagram of the multibeam, digitally-modulated, time division switched communication system according to the present invention.

Turning now to the drawings, FIG. 1 shows an overall block schematic diagram of the multibeam, digitally modulated, time division switched repeater communication system according to the present invention. The system is shown as broadly comprising a repeater 1, which for purposes of discussion will be an orbital satellite repeater, and a plurality of ground station areas, designated 2a to 2n, with each ground station area including one or more ground terminal stations 3. At each of the ground station areas 2a to 2n, a plurality of digital baseband communication channels are assembled and modulated such that the combined output from each of the included ground terminal stations 3 in each ground station area includes at least two separate digitally modulated radio-frequency (r-f) channels 4a and 4b which are multiplexed, using frequency division techniques, into a single up-link beam 5a to 5n, respectively, for microwave transmission to repeater 1. It is to be understood that where two or more ground terminal stations 3 are included in a ground station area (e.g., ground station area 2a in FIG. 1), the digitally modulated bit streams generated at each terminal station 3 can be either formed into one or more separate r-f channels of the associated up-link beam 5a to 5n or combined by any suitable manner with the bit stream of another terminal station 3 to form an r-f channel 4a or 4b of the associated up-link beam. Additionally, although each up-link beam 5a to 5n is shown in FIG. 1 as comprising only two r-f channels, it must be understood that more than two r-f channels can be frequency multiplexed to form a particular up-link beam, depending on the traffic needs of each of the particular ground station areas 2a to 2n and the terminal stations 3 therein. However, where moe than two r-f channels make up an up-link beam, suitable modifications are required at repeater 1 in the transponder unit and switch arrangements and, therefore, for descriptive purposes it will be assumed hereinafter that each up-link beam comprises only two r-f channels 4a and 4b.

At repeater 1, each of the up-link beams 5a to 5n is received by an antenna means (not shown) which is capable of receiving and separating up-link beams 5a to 5n, which can comprise the same frequency band, for transmission to transponder units 6a to 6n, respectively. Additionally, the antenna means should be capable of transmitting down-link spotbeams 7a to 7n, comprising an r-f microwave channel from transponder units 6a to 6n, respectively, to the respective ground station areas 2a to 2n using space diversity techniques. Such antenna means can comprise any suitable antenna configuration such as, for example, a separate spotbeam antenna for each ground station area. Although each down-link beam 5a to 5n is shown in FIG. 1 as comprising only one r-f channel, it must be understood that more than one r-f channel can be frequency multiplexed to form a particular down-link beam, depending on the traffic needs of each of the particular ground station areas 2a to 2n and the terminal stations 3 therein. Additionally, where the same frequency band is used for the up-link and down-link transmissions at adjacent ground station areas the up-link and down-link signals associated with one ground station area can be transmitted using one form of polarization while the up-link and down-link signals from an adjacent ground station area can be transmitted using another form of polarization to ensure reduced interference between the signals of the adjacent areas.

Within each of the transponder units 6a to 6n, the r-f channels 4a to 4b within the associated up-link beams 5a to 5n are collectively converted from their microwave frequency band to an intermediate frequency (IF) band in downconverter 11 and from the IF band to baseband frequencies by demodulators 12a and 12b. Downconverter 11 and demodulators 12a and 12b can comprise any suitable configuration for performing the functions indicated.

At the output of downconverter 11, the two IF band channel signals 4a and 4b are directed along paths 13a and 13b, respectively, using any suitable separation means (not shown) such as, for example, the combination of hybrid and filter circuits. The digitally modulated IF channel signals 4a and 4b are demodulated to baseband frequencies in demodulators 12a and 12b, respectively, and are, in turn, used as input signals to both logic circuits 14a and 14b, respectively, and clock, synchronization, and framing circuits 15a and 15b, respectively. Clock, synchronization, and framing circuits 15a and 15b in each of transponder units 6a to 6n are in reality a part of demodulators 12a and 12b and broadly function to both (a) compare the associated digitally modulated baseband signal information with the signal from a repeater master clock 16 and (b) provide a signal to logic circuits 14a and 14b, respectively, indicating whether the associated baseband digital information signal is synchronized with the master clock signals. Logic circuits 14a and 14b broadly function to direct a synchronized baseband input signal to the horizontal level of a first and a second matrix switch 17a and 17b, respectively, corresponding to the number of the associated transponder unit wherein the particular logic circuit resides. For example, logic units 14a and 14b of transponder unit 0, designated 6a in FIG. 1, direct the associated synchronized input signals to horizontal 0 of switches 17a and 17b, respectively; logic circuits 14a and 14b of transponder unit 1, designated 6b, direct the associated synchronized input signals to horizontal 1 of switches 17a and 17b, respectively; etc. The clock, synchronization and logic functions will be described in greater detail with reference to the discussion of FIG. 7.

The synchronized channel information signals from logic circuits 14a and 14b of transponder units 6a to 6n are concurrently switched through matrix switches 17a and 17b to the appropriate transponder units 6a to 6n designated in the control information sent to switch control circuits 18a and 18b by each of logic circuits 14a and 14b, respectively. The switched information signals from switches 17a and 17b concurrently arrive at the appropriate transponder unit 6a to 6n in pairs where the paired signals are combined in a time shared manner by any suitable means, such as, for example, the phase modulator and r-f source 19 shown in FIG. 1. The combined signals are then raised from baseband to microwave frequencies by upconverters 20 for transmission to the appropriate ground station areas 2a to 2n via down-link spotbeams 7a to 7n, respectively.

In the discussion above it was assumed that each ground terminal station 3, within each of ground station areas 2a to 2n, is fixedly assigned to a particular portion of r-f channels 4a and 4b, forming the associated up-link beam, for its digitally modulated transmissions to repeater 1. Where it is desired to provide flexibility within the system, such as, for example, to accommodate changing traffic demands within the ground station areas 2a to 2n, a central control 21 can be connected directly or via a satellite repeater link to each of ground terminal stations 3. In this manner, central control can transmit selected control signals to administratively alter the arrangement by which two or more ground terminal stations 3, within a particular ground station area 2, combine their digitally modulated signals to form the associated r-f channels 4a and 4b.

For purposes of discussion and for a clearer understanding of the present invention, it will be assumed hereinafter that there are 16 up-link beams 5a to 5n, each up-link beam being split into two 50 megabit/sec channels 4a and 4b, and 16 down-link channels with each down-link channel feeding a separate one of beams 7a to 7n, at the 100 megabits/sec rate. The switching arrangement will constitute two 16 × 16 matrix switches, 17a and 17b where two outputs, one from each 16 × 16 switch, are combined at each down-link phase modulator and r-f source 19. Compared to a single 16 × 16 switch-100 megabit/sec network, this configuration is (a) essentially equivalent in traffic carrying capability, (b) provides greater reliability by degrading gracefully rather than failing catastropically since there are two paths rather than one connecting each up-link beam to each down-link beam and (c) operates at half the information bit rate. Each of the 16 × 16 matrix switches 17a and 17b must be capable of connecting each of the associated channels 4a or 4b in each of up-link beams 5a to 5n to each of down-link beams 7a to 7n for proper system operation.

For purposes of illustration and for a clearer understanding of the present invention, the channel 4a or 4b signaling format will be assumed to be based on the known T-1 carrier system format, where such illustration must be understood as not to limit the information content to only pulse code modulation (PCM) but also could include systems employing a T-1 format without requiring PCM, such as, for example, Subscriber Line Multiplexing (SLM) and Digital Data Systems (DDS).

Figure 2:
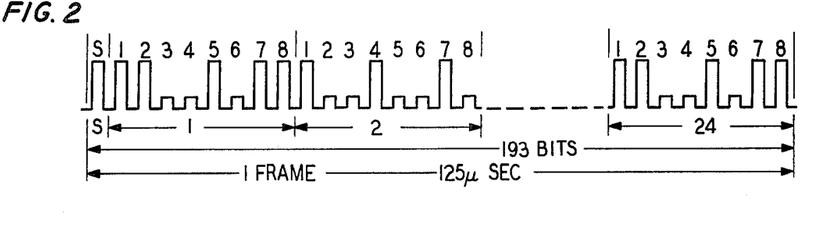
FIG. 2 illustrates the signal format employed by the prior art T-1 carrier system.

FIG. 2 illustrates the PCM signal format of a T-1 carrier system where each of 24 voice frequency (VF) channels are sequentially sampled 8000 times per second and the amplitude of each sample is encoded into 8 binary information bits. A synchronizing bit "S" is inserted before each binary set of 24 sequential samples to form a T-1 frame constituting 193 bits of information. The synchronizing bit permits the incoming binary bit stream to be synchronized at the receiving terminal to enable reconstruction of the original analog samples.

Figure 3:
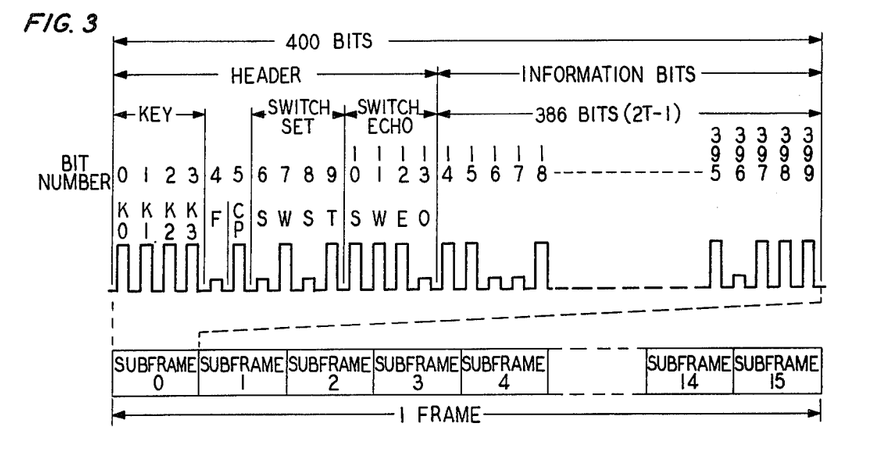
FIG. 3 illustrates the signal format employed in the system shown in FIG. 1 between the ground terminal stations and the satellite repeater.

In the present system the format for transmitting signals in each half of the up-link beams 5a to 5n and each of down-link beams 7a to 7n is shown in FIG. 3. There, a frame is shown as constituting 16 subframes (one for each ground terminal area) transmitted, for instance, at the rate of 8000 frames/sec. Each subframe is shown as comprising 400 bits of information including 14 bits of header information and 386 information bits formed from two separate sequentially arranged T-1 carrier frames. From the above, it can be determined that each up-link r-f channel 4a and 4b comprises signals transmitted at a 51.2 megabit/sec rate for a total of 768 voice circuits (32 T-1 systems). It must be remembered that up-link r-f channels 4a and 4b are being simultaneously transmitted using frequency diversity techniques for a combined transmission rate of 102.4 megabits/sec per up-link beam while the single channel associated down-link beam is transmitted at the 102.4 megabit/sec rate. Therefore, at any instant of time, phase modulator and r-f source 19 in each of the 16 channel units 6a to 6n at repeater 1 is combining, for transmission by up-converter 20, two up-link r-f channel frames for a 16,000 frames/sec down-link transmission rate. Phase modulator and r-f source 19 can achieve such channel frame transmission by any suitable means such as, for example, the use of 4-phase modulation, 2-phase modulation at twice the 4-phase modulation frequency or with separate r-f channels.

The 14 information bits comprising each subframe header section includes the following subsections:

Key bits: four key bits, all 1s are located in bit positions 0–3 and are used to identify the start of each subframe and also to act as the key to unlock the switch so it can be set by information sent by the ground terminal station;

F bit: the F bit is located in bit position 4 and is used to identify the subframe number within the frame;

CP bit: the CP bit is located in bit position 5 and is used to send information to the ground terminal station 3 concerning the synchronization (phase relationship) of the clock received from the ground terminal station as compared to the satellite repeater clock 16;

SWST bits: these 4 bits are located in bit positions 6–9 and are used to set the switch 17a or 17b in the satellite repeater for connecting the input channel to the output channel (SWitch SeT): and SWEO bits: these 4 bits, located in bit positions 10–13, are used to identify the channel from which information is being received (SWitch EchO).

The functioning of the above-described header section pulses will be described in greater detail in association with the functioning of the logic and clock, synchronization and framing circuits shown in FIG. 7.

Figure 5:
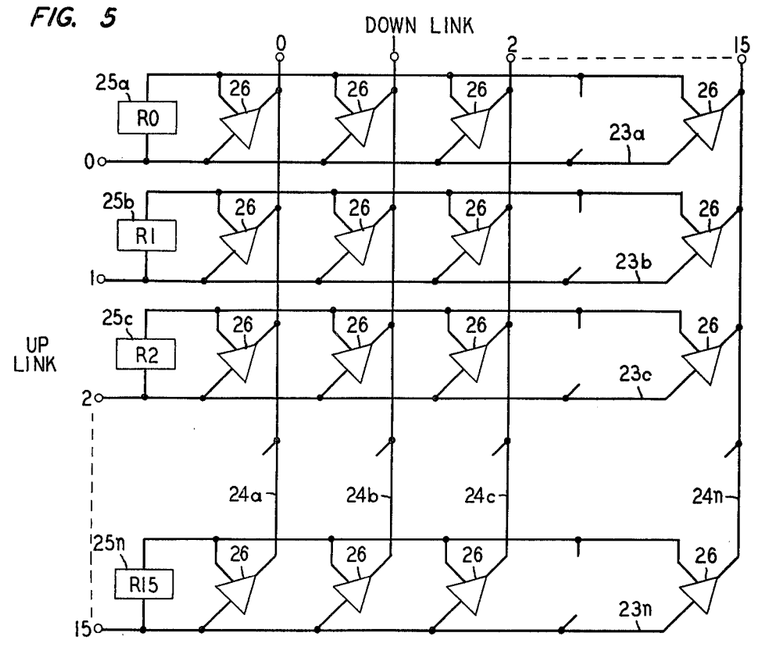
FIG. 5 is a simplified schematic diagram of an arrangement of one of the switches shown in FIG. 1.
Figure 6:
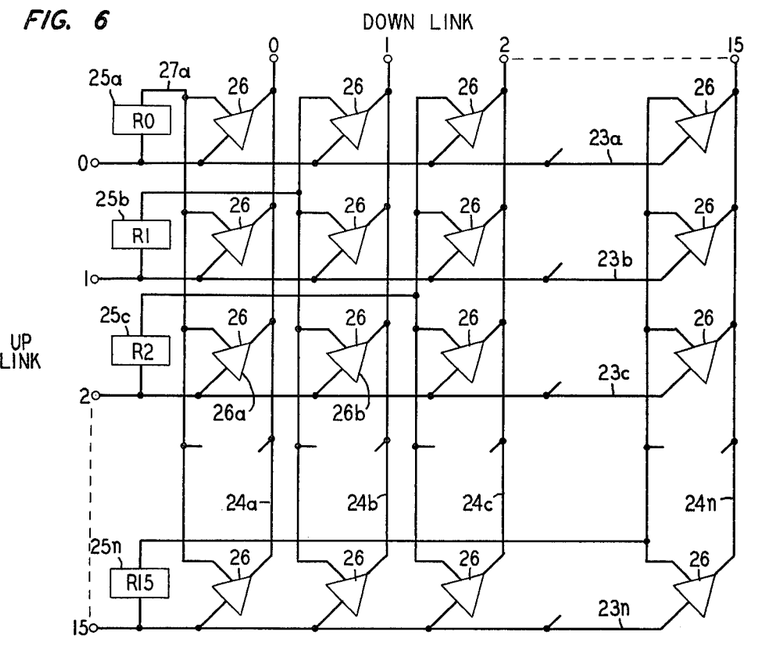
FIG. 6 is a simplified schematic diagram of another, and the preferred arrangement of, one of the switches shown in FIG. 1.

In general, it is desired to keep the operation of switches 17a and 17b in repeater 1 as simple as possible. To this end, control information in each subframe header section is received from the associated ground station area 2a to 2n, and simple logic operations on this information are performed in repeater 1 to direct the relaying of information from the input to the output ports of switches 17a and 17b. The basic operation of the switches 17a and 17b can be accomplished in one of two ways: each switch can be operated so information from the input port is directed to a particular output port as shown in the known arrangement of FIG. 5, or each switch can be operated so that the output port is directed to receive information from a particular input port as shown in the arrangement of FIG. 6. The horizontal paths 23a to 23n in each of FIGS. 5 and 6 represent the input channels which receive information bits from the associated r-f channels 4a or 4b of the associated up-link beams 5a to 5n while the vertical paths 24a to 24n represent the output channels to which the input channels can be switched for retransmission on one of down-link beams 7a to 7n. As shown in FIGS. 5 and 6, registers 25a to 25n are associated with switch horizontal paths 23a to 23n, respectively, for storing the Switch Set (SWST) pulses in each received subframe header section for use in operating the gates 26 forming the switch points. Registers 25a to 25n form part of control circuits 18a and 18b of the switches 17a and 17b, respectively, shown in FIG. 1. Although either of the arrangements shown in FIGS. 5 and 6 can be used, the switch arrangement shown in FIG. 6 is the preferred arrangement based on reliability and hardware design and ease of conferencing considerations and, therefore, will be used exclusively for the description which follows:

With the arrangement of FIG. 6, it must be understood that the Switch Set bits of the header section of each subframe configuration, as shown in FIG. 3, are used to select the input port which will be connected to a particular output port of each of switches 17a and 17b of FIG. 1. For example, if the up-link beam on channel 2 is to be connected to the down-link beam on channel 0, the Switch Set bits in the subframe forming the up-link beam on channel 0, in register 25a, will indicate the code for channel 2. The code in register 25a will cause signals to be transmitted along bus 27a which will close the gate marked 26a to permit the information on input channel 2 to be directed to output channel 0. It must be understood that while input channel 2 is being connected to output channel 0, the remaining input channels (channels 0, 1, and 3-15) are being simultaneously connected to separate ones of the remaining output channels (channels 1-15) unless a conference call has been formed. For a conference call arrangement, if it were desired, in the example above, to simultaneously transmit the information on input channel 2 to both output channels 0 and 1, both registers 25a and 25b of FIG. 6 would then include the code of input channel 2 to simultaneously close gates 26a and 26b, respectively.

The switching network essentially consists of three parts: clock, synchronization, and framing circuits 15a and 15b in each of transponder units 6a to 6n, logic circuits 14a and 14b in each of transponder units 6a to 6n, and switches 17a and 17b including the registers 25a to 25n in control circuits 18a and 18b.

Clock and framing information is established for the entire satellite network from the clock, synchronization, and framing circuits 15a and 15b in the repeater. The master clock circuit 16 generates a bit frequency which is equal to the normal bit rate of up-link channels 4a and 4b, which for the present description is 51.2 megahertz. The master clock frequency is preferably obtained from a 51.2 megahertz signal modulated on a carrier transmitted over a separate r-f channel to the repeater 1 from a ground terminal station 3. The repeater master clock frequency could also be derived from one of the 32 transponder clocks in clock, synchronization, and framing circuits 15a or 15b established at repeater 1. For example, master clock 16 is shown in FIG. 1 as deriving its frequency from clock, synchronization, and framing circuit 15a of transponder unit 6a (shown by a dotted line). Long term drift effects as well as the ability to obtain the repeater master clock frequency from different sources in case of failure imply that obtaining the master clock frequency from the ground is preferable to an independent master clock contained in repeater 1. However, the operation of the whole system depends solely on the master clock 16 in satellite repeater 1.

Figure 7:
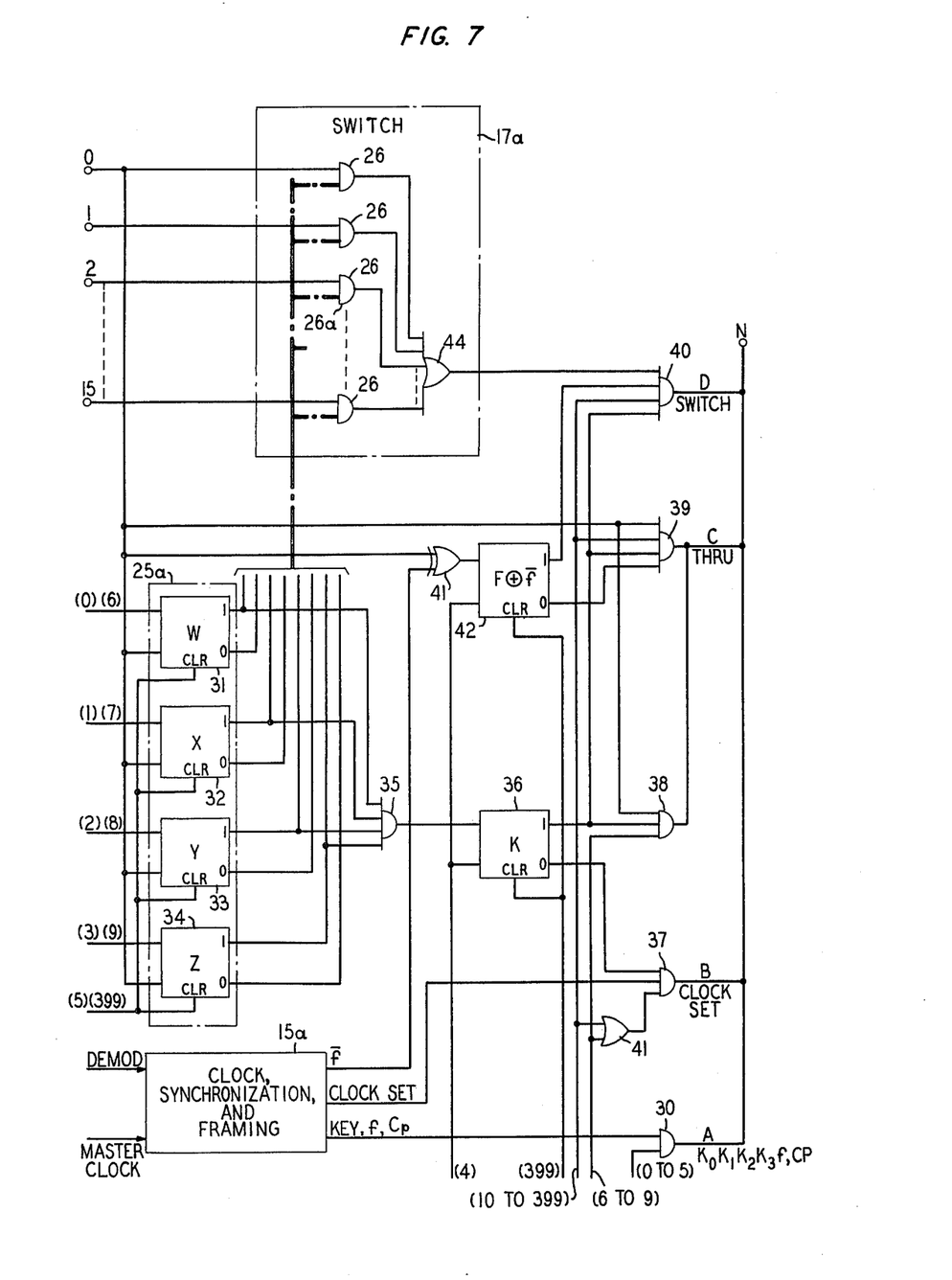
FIG. 7 is a simplified partial schematic and partial block diagram of the switch and logic arrangement in the repeater in accordance with the present invention.

FIG. 7 is a simplified schematic of the elements in transponder 6a and the associated vertical (vertical 0) of switch 17a for directing signals to down-link beam 7a in response to the received subframe signals on channel 4a of up-link beam 5a. It is to be understood that transponders 6a to 6n and switches 17a and 17b each comprise elements similar to that shown in FIG. 7 for simultaneously directing signals to their associated down-link beams 7a to 7n in response to subframe signals in the other associated channels 4a and 4b of up-link beams 5a to 5n in the manner described hereinafter for channel 4a of up-link beam 5a.

A count-down circuit (not shown) in clock, synchronization and framing circuit 15a is used to identify each of the 400 bit positions within the subframe. This count-down circuit is also adapted to supply bit timing pulses which are used to synchronize the flow of information through switch 17a from the up-link receiver side of one of transponders 6a to 6n to the down-link transmit side of transponder 6a.

The numbers shown in parentheses at the bottom and left side of FIG. 7 refer to the particular bit time when a bit timing pulse is transmitted along the indicated lead to the connected circuits.

Four paths are shown through transponder 6a and switch 17a of repeater 1 as represented by the labels A, B, C, and D at the righthand side of FIG. 7. The first six bits of every subframe transmission from transponder 6a to the associated ground station area 2a is derived from clock, synchronization, and framing circuit 15a for transmission via Path A. These six bits consist of Key bits K0 to K3 which are always 1s to provide a unique code in accordance with the present invention for identifying the start of each subframe which code is common to all simultaneously transmitted subframes in down-link beams 7a-7n; the F bit which is generated by the master clock circuit 16 and transmitted through clock, synchronization, and framing circuit 15a for identifying the subframe number within a frame is common to all corresponding subframes within a frame of all channels, as will be discussed in greater detail hereinafter with regard to synchronization; and the CP pulse which is separately generated for each subframe in each channel and used to send information to the associated ground terminal station 3 concerning phase synchronization of the clock signals received from ground station area as compared to the master clock signal. As shown in FIG. 7, these six bits of information are sent over Path A upon arrival at AND gate 30 concurrent with the bit timing pulses generated during bit times 0 to 5 to form a portion of the header bits for transmission on down-link beam 7a.

Paths B, C, and D allow transmission of additional header and information signals through repeater 1 during bit times 6 to 399. Which of these three paths is chosen is controlled by the information contained in the header (first 14 bits) of the up-link signal. In this manner the circuitry for storage and control functions are included at each ground terminal station 3 with only the circuitry for completing the switching function being located at satellite repeater 1. Such store-switch-store configuration advantageously produces greater repeater reliability with reduced weight, size and power requirements which is especially important where repeater 1 is an earth satellite. The three paths for generating separate associated signals are generally represented by the labels CLOCK SET (Path B), THRU (Path C), and SWITCH (Path D). The reason for generating the signals on Paths A, B, C, and D is that three operations must be performed in initializing the satellite repeater system operation and assuring proper operation thereafter under conditions where control is exercised from each ground terminal station rather than at repeater 1.

To understand the signals generated on Paths A, B, and C it must be remembered that master clock 16 at repeater 1 runs at the frequency set by a master ground terminal station 3. The clocks at the other ground terminal stations 3 must be synchronized with master clock 16, and the corresponding subframes in each up-link r-f channel must be synchronized to permit the corresponding subframes to be simultaneously received and switched through repeater 1.

Figure 8:
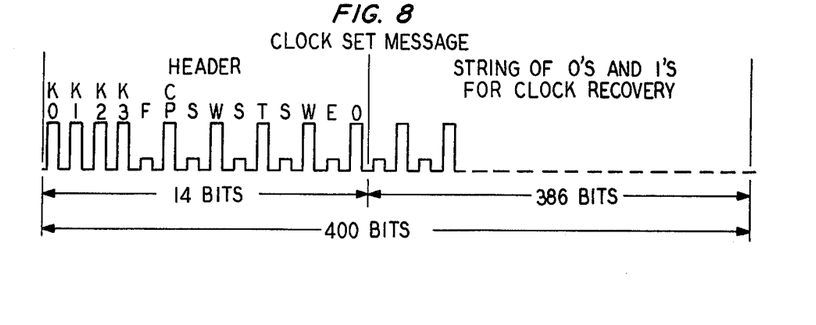
FIG. 8 illustrates the signal format of the clock set message transmitted between the repeater and each ground terminal station.

The first operation in this synchronization procedure is to establish a clock at each ground station down-link receiver which is synchronous with repeater master clock 16 to enable recovery of the received bits in the associated down-link beam. For this purpose the signals previously described on Path A followed by a CLOCK SET signal on Path B consisting of 0s and 1s as shown in FIG. 8 are transmitted to the ground terminal station 3 of ground station area 2a associated with up-link channel 4a of up-link beam 5a. From these signals, the received bit and frame information can be derived at the ground terminal station 3. The CLOCK SET signal path (Path B) is energized when no meaningful information is being sent by the associated ground terminal station 3. This latter condition can be identified at repeater 1 when the Key bits (bits 0–3) of the up-link header information are not received as all 1s.

In FIG. 7, Key bits 0–3 are received via channel 4a of up-link beam 5a at horizontal 0 of switch 17a and at the inputs to flip-flops 31–34, respectively, (forming register 25a of FIG. 6) concurrent with timing pulses 0–3. When Key bits 0–3 are not synchronous with bit timing pulses 0–3, all 1s will not be stored in flip-flops 31–34 and, in turn, AND gate 35 will not generate a high output pulse to flip-flop 36. The application of bit timing pulse 4 to the input port of flip-flop 36 in turn causes a high to be generated at the output port to enable AND gate 37 (Path B), and a low to be generated at the 1 output port to inhibit AND gates 38, 39 and 40 (Paths C and D). Bit timing pulses 6 through 399 pass through OR gate 41 to fully enable AND gate 37 and permit the CLOCK SET signal to be added to the signals from Path A, as shown in FIG. 8, for transmission on down-link beam 7a.

Ground terminal station 3 synchronizes its demodulation clock to the incoming CLOCK SET signal bit stream and thus demodulates this bit stream correctly. Since repeater transmissions are timed by a continuously running master clock 16, standard clock recovery techniques can be used at each ground terminal station 3.

The ground terminal station next adjusts the phase and frequency of its up-link bit stream to place it in synchronism with the reception of all other up-link transmissions at repeater 1. The phase of the clock in clock, synchronization, and framing circuit 15a derived from the up-link bit stream is compared to that of master clock 16 in clock, synchronization, and framing circuit 15a. The sign of any detected phase error is transmitted via the down-link beam 16 times per frame by the CP bit (bit 5) in each of the 16 subframes. The CP bit is then used at the associated ground terminal station 3 to appropriately change the phase and frequency of the up-link bit stream to achieve and maintain phase synchronization.

Figure 10:
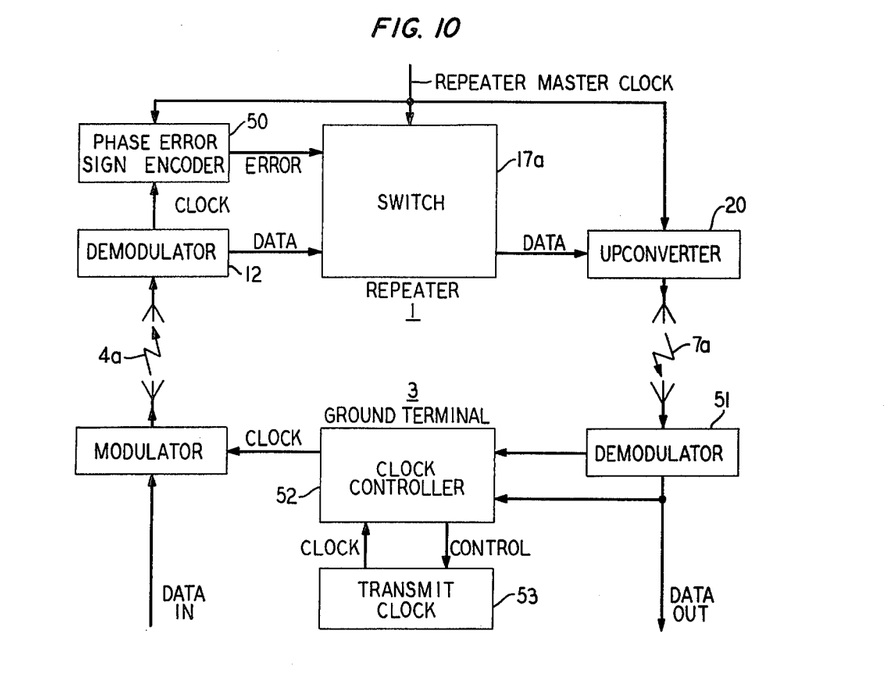
FIG. 10 shows a simplified block schematic of the overall bit synchronization technique according to the present invention.

The preferred arrangement for achieving bit synchronization, as just described hereinabove, is shown in more detail in FIG. 10. The purpose of this subsystem is to insure that all up-link transmissions arrive bit-synchronous at repeater 1 so that the transmissions can be switched on a bit-by-bit basis. As shown in FIG. 10, the up-link channel (e.g., channel 4a) is demodulated in demodulator 12 at repeater 1; the output pulses being at a clock rate derived from, and synchronous with, the upcoming bitstream. The phase of this recovered clock is compared with that of the repeater master clock 16 in phase error sign encoder circuit 50 forming a part of clock, synchronization, and framing circuit 15a. The binary output from circuit 50 indicates the sign of any detected phase error between the two clock signals. This one-bit error signal (CP bit of the header information) is modulated in upconverter 20 and sent over the down-link 7a to ground terminal station 3 with the overall down-link message signal. At ground terminal station 3, the down-link transmissions are demodulated in demodulator 51 and the recovered down-link clock and up-link phase error information (CP bit) is sent to clock controller 52. Frequency correction is necessary, for example, to allow for tracking of motion-induced doppler shift where the repeater is an orbiting satellite, or to correct for clock oscillator instability or for changing atmospheric conditions. Phase corrections are then necessary to stabilize the overall feedback loop. By observing the telemetered phase-error information (CP bit), the ground terminal station 3 determines the phase error detected at transponder 6a. With this information, the ground terminal station 3 corrects the frequency of its up-link transmit clock 53 to the expected time of phase coincidence at repeater 1 using any suitable adaptive phase and frequency stepping techniques.

The second operation needed to synchronize the switching network is to identify and then synchronize the 16 subframes within each frame in the up-link and down-link transmissions to permit simultaneous switching of the 32 r-f channel transmissions 4a and 4b of the 16 up-link beams 5a to 5n through switches 17a and 17b.

The switching network in repeater 1 has been kept as simple as possible to minimize the power required, and this minimization procedure has been aimed at dispensing with memory in the satellite repeater whenever possible and at the same time exercising as much control as possible at the ground terminal stations 3 to achieve maximum switching configurability. The F bit (bit 4), as was explained hereinbefore, is used to identify the individual subframes within a frame. The identification sequence code chosen for the 16 subframes is

| Subframe Number |
|---|
| 0 1 2 3 4 5 6 7 8 9 10 11 12 13 14 15 |
| F-bit |
| 1 0 0 1 1 1 0 0 0 1 1 0 0 0 1 1 |

The EXCLUSIVE-OR correlation operation with the above code sequence allows individual subframe identification to be established within a frame. The operation at the ground terminal station 3 becomes one of storing the last 16 F-bits in a shift register, EXCLUSIVE-ORing each bit of the stored sequence with the corresponding bit from memory containing the sequence S = 1001110001100011, and summing to obtain the number of 1s produced, which can be shown mathematically as $$y_m = \sum_{n=0}^{15} F_{m+n} \oplus S_n \quad (1)$$

where $m$ is the subframe to be identified, i.e., $F_{m+15}$ will be the latest F-bit received. The sequence of $y_m$s allows subframe identification to be established.

The EXCLUSIVE-OR correlation operation on the F-bit sequence is

| Subframe Number bit $F_m$ |
|---|
| 0 1 2 3 4 5 6 7 8 9 10 11 12 13 14 15 |
| $y_m$ |
| 0 6 12 14 8 2 4 10 16 10 4 2 8 14 12 6 |

This sequence repeats modulo 16. Thus at the ground terminal station 3 a particular subframe can be identified by knowing the value for $y_m$ (or $y_{m-1}$ and $y_m$). The value for $y_m$ is also the value for $y_{m+15}$ since $F_{m+}$ was the latest F-bit received and, therefore, the next F-bit is $F_{m+16}$. Furthermore, since $F_m = F_{m+16}$, the subframe number for $F_m$ is also the subframe number for $F_{m+16}$, the next F-bit which will arrive.

The identification of the F-bit is made easy since the signal which is received at the ground terminal station 3 is the CLOCK SET message shown in FIG. 8. The four 1s which identify the start of each subframe are unique and form the only sequence of four serial 1s in that message. The first step, then, in achieving subframe synchronization in the up-link and down-link transmissions, after achieving clock and bit synchronization, is to establish subframe identification using the EXCLUSIVE-OR operation on the F-bit sequence as explained hereinabove.

Figure 9:
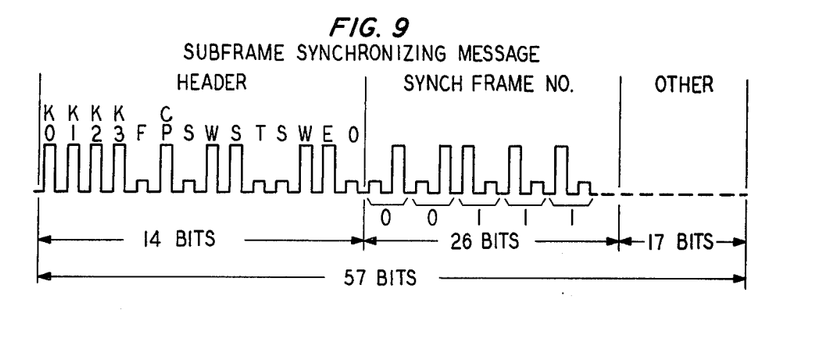
FIG. 9 illustrates the signal format of the subframe synchronizing message transmitted between the individual ground terminal stations and satellite repeater.

The second step in achieving subframe synchronization is to synchronize the ground subframe transmissions so bits from the ground terminal station 3 arrive at repeater 1 in synchronism with the subframe timing pulses and F bit generated codes at the repeater. To do this, a synchronizing message, having the bit structure shown in FIG. 9 is sent by each ground terminal station 3 to the associated transponder 6a to 6n in repeater 1. The number 400 (corresponding to the 400 bit subframe) is a convenient number because it is 0 modulo 16 and makes counter operation simple, and also because the number 399, being one less than 400, is equal to 3 × 7 × 19. The number 399 is used because a sequence of bits of length 399 would shift or move through a 400 bit sequence one bit at a time. So do the factors of 399, only faster. For example, 57 moves through seven times as fast. In the synchronizing message of bit length 57 (shown in FIG. 9), the only four-bit serial string of 1s appears at the start of each synchronizing subframe. This is followed by the F and CP pulses and the SWST bits having the code of the transmitting ground terminal station (e.g., code 0000 for ground station area 2a). As the bits shift or move through each 400 bit sequence, when four 1s arrive at repeater 1 in synchronism with the four Key timing bits, the switch is activated to relay the synchronizing message through Path D to the originating ground terminal station 3 if the F pulse is also correct or through the THRU Path (Path C) if the F pulse does not correspond.

As seen in FIG. 7, when the four 1s arrive at flip-flops 31–34 concurrent with timing bits 0–3, a high output is generated at AND gate 35 to cause a high output at the 1 output port of flip-flop 36 to enable AND gates 38 to 40. When the received F-bit is EXCLUSIVE-ORed in gate 41 with the inverted $f$ bit generated at master clock 16, flip-flop 42 generates a high at either its 0 port to enable AND gate 39 when the F and $f$ bits do not correspond or at its 1 port to enable AND gate 40 when the F and $f$ bits correspond. Therefore, as the continuous synchronizing messages shift or move through the 400 bit message sequence and four 1s are not received at repeater 1 in synchronism with the Key timing bits, a CLOCK SET message (from Paths A and B) will be transmitted on the down-link beam. Alternatively, whenever the four Key bits of the synchronizing messages are received in synchronism with the Key timing bits at the repeater, the ground terminal station bits 6 to 399 of the synchronizing message are relayed via Paths C or D (depending on whether the F and $f$ bits match or not) and added to bits 0–5 from Path A for transmission back to the originating ground terminal station 3.

It should be noted that the synchronizing subframe also contains the information required to activate the channel clock in clock, synchronization, and framing circuit 15a at repeater 1, and that the phase information telemetered back to the ground terminal station 3 by the CP pulse during each subframe allows for proper continued synchronization of the ground transmitting clock 53 (FIG. 10) with the master clock 16 at repeater 1.

The only remaining operation to be performed is to identify where in the information frame the synchronizing frame is located. Briefly, a series of sequentially numbered 57 bit subframe synchronizing messages are transmitted by each ground terminal station 3, which, in turn, receives back from repeater 1 during each 400 bit subframe interval within a series of message frames either a CLOCK SET message (FIG. 8) or a 400 bit message comprising seven sequentially numbered synchronizing messages. When the 400 bit message comprising the seven synchronizing messages is received during the first subframe (subframe 0) within a frame of the series of message frames, the number contained in the first of the seven synchronizing messages is used to synchronize the ground terminal station transmitter.

More particularly, since the message frame within the series of message frames is 6400 bits long (16 × 400) and the repeated synchronizing frame is 57 bits long, it is necessary to know the number of bits required for bits within both series to be repeated, i.e., M × 6400 = N × 57. The smallest M or N for which the relationship is true turns out to be where M = 57 and N = 6400 and the message and synchronizing series is thus 364,800 bits long. This also means that there are 6400 − 57 bit synchronizing frames in each synchronizing series. Thus each synchronizing frame (1 of 6400) can be identified by a 13 bit sequentially numbered code. To preserve the sanctity of the requirement that the only four 1s sequence appear as Key bits, this 13 bit number should be expanded to 26 bits, i.e., representing a 0 as 01 and a 1 as 10. Since 14 bits were required for the synchronizing message header and 26 bits for the frame identification, 17 bits are left for other purposes subject to the four 1s constraint.

As explained hereinabove, the synchronizing message will be returned to ground terminal station 3 every time that the four 1 Key bits of a particular synchronizing message arrive in synchronism with the Key timing bits generated at repeater 1. When this occurs, 7 consecutive synchronizing messages, the maximum to be transmitted during a 400 bit message subframe of FIG. 3, will be received at ground terminal station 3. Therefore, once every 57 information subframes, or 22,800 bits, the ground terminal station 3 will receive 7 consecutive synchronizing messages having 7 sequential synchronizing frame numbers (located in the bits 14–39) as synchronizing series shifts or moves through the message frame series. Clearly, by identifying both the information subframe 0, using the $f$ bits as described hereinabove, and the synchronizing subframe number, using bits 14–39 of the first synchronizing message which is received at ground terminal station 3 during subframe 0, it is possible to achieve immediate frame synchronization. For example, if subframe 0 of the message sequence lines up with the synchronization message indicating synchronization frame 3385, then the first Key bit, bit 0, would be bit number 192,945 (57 × 3385) of the synchronizing series. Since there are 364,800 pulses in a complete synchronization series, the simple addition of 171,855 (364,800 minus 192,945) to the count of a bit counter at the ground terminal station 3 maintaining the count in each synchronizing series means that 0 on the bit counter then corresponds to bit 0 occurring in subframe 0 at repeater 1. In this manner synchronization of the up-link ground transmitting clock and frame and the repeater clock and frame is achieved and message transmission can commence using the format of FIG. 3.

For switching the message sequence, the bit sequence transmitted via r-f channel 4a of up-link beam 5a is shown in FIG. 7 as being received via horizontal input 0 of switch 17a. Key bits 0–3 are first gated into flip-flops 31 to 34, respectively, of register 25a. After synchronization has been achieved, bits 0–3 of each received subframe are all 1s and cause flip-flops 31–34 to generate a high on each 1 output port which, in turn, causes flip-flop 36 to generate a high output at its 1 port to enable AND gates 38–40. Timing bit 5 clears flip-flops 31–34 of register 25a, and header bits 6 to 9 are, in turn, both gated into flip-flops 31 to 34, respectively, and transmitted on down-link beam 7a via gate 38 and Path C, following the bits 0–5 generated in clock, synchronization, and framing circuit 15a and transmitted via Path A. Since it was previously assumed for exemplary purposes that output channel 0 of switch 17a is to be connected to input channel 2, the code in bits 6–9 stored in flip-flops 31 to 34 of register 25a would be that of input channel 2. For proper operation, AND gates 26 of vertical 0 of switch 17a are each connected to one of the 0 or 1 output ports of each of flip-flops 31 to 34 such that the stored code causes high outputs on the corresponding four leads to which the designated AND gate is connected. The stored code for horizontal 2 therefore, would enable gate 26a in output channel 0 (vertical 0) of switch 17a to transmit the message bits 10 to 399 received at input channel 2 on the down-link beam 7a via OR gate 44 and AND gate 40 (Path D). Finally, Timing bit 399 clears flip-flops 31–34, 36 and 42 to prepare for processing the next subframe header and information bits.

Error detection at each ground terminal station 3 is accomplished using, inter alia, the Switch Set and Switch Echo bits (bits 6 to 13) of the header section of each received subframe. From FIG. 7 it can be seen that the Switch Sets bits (bits 6–9), for controlling the repeater switching network, transmitted by each ground terminal station 3 in each subframe of the associated up-link channel 4a and 4b are retransmitted back to the originating ground terminal station 3 via either AND gate 37 and Path B or AND gate 38 and Path C. For purposes of error detection, however, only the retransmission of the Switch Set bits via Path C will be considered in the following discussion. Immediately following the Switch Set bits, either the Switch Echo bits (bits 10–13) and the remaining subframe information received from the originating ground terminal station are retransmitted back to the originating ground terminal station via AND gate 39 and Path C, or the Switch Echo bits and the remaining subframe information from another ground terminal station are switched through the repeater switching network and transmitted via AND gate 40 and Path D to the associated ground terminal station. Therefore, at each ground terminal station, by comparing the Switch Set and Switch Echo bits it can be determined whether the received subframe information is either correct and to be processed further or erroneous and to be ignored. For example, if the Switch Set bits contain the code for up-link beam 2 and the received Switch Echo bits contain the code for up-link beam 2, such match indicates that the information was properly switched through the repeater switching network. If, however, the received Switch Echo bits indicated the code for up-link beam 14, then there would not be a match between the Switch Set and Switch Echo bits and the received information should not be processed for distribution to the T-1 channels associated with the receiving ground terminal section.

Figure 4:
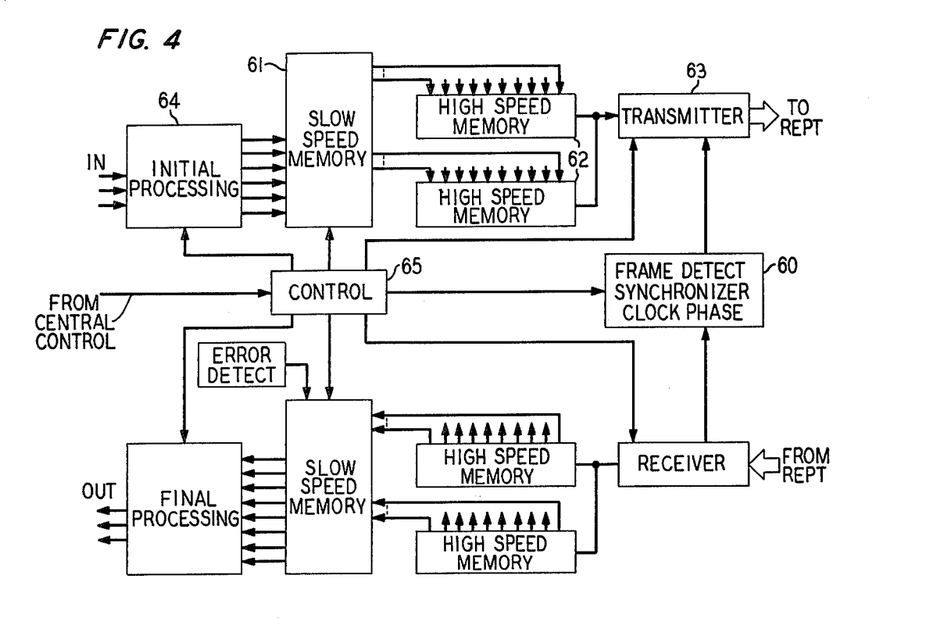
FIG. 4 is a schematic block diagram of a typical ground terminal station according to the present invention.

FIG. 4 shows a simplified block diagram of a typical ground terminal station 3 in accordance with the present invention. The frame detection, synchronization, clock phase and frequency correction and error detection procedure in accordance with the present invention have been described hereinabove and are carried out in Frame Detection and Clock Phase Synchronizer circuit 60 which includes Clock Controller 62 and the Transmit Clock 53 of FIG. 10. The store functions of the store-switch-store switching arrangement are located at each ground terminal station 3 and comprise a slow speed memory 61, a high speed memory 62 and a processing circuit 64.

In operation, a plurality of T-1 channels, having the signaling format shown in FIG. 2, are concurrently received by initial processing circuit 64. There, the 8 bit words in the T-1 channels are separated and transmitted, under the direction of control circuit 65, to the specified storage areas in slow speed memory 61 associated with each of the ground station areas 2a to 2n to which the individual T-1 messages are destined. The 8 bit words destined for a particular ground station area are then parallel dumped into high speed memory 62 to form one subframe containing the appropriate header section information for switching the maximum of 48 T-1 messages in that subframe through repeater 1 to that particular ground station area. It is to be understood that the assignment of each subframe within a frame to an individual ground station area is controlled by control circuit 65 under the direction of master control station 21 (FIG. 1) and that such assignment can be changed when changing traffic needs so require.

Next, the high speed memory 62, containing one subframe, is serially dumped to the transmitter 63 for transmission to repeater 1. It is to be understood that synchronizing frames as well as information frames can be assembled in this manner. The low speed memory loading procedure is controlled from control circuit 64 while the high speed memory dumping is controlled from the transmitter clock 53 in Frame Detection and Clock Phase Synchronizer circuit 60 under the direction of control circuit 64. The components forming ground terminal station 3 can comprise any suitable circuitry which may be commercially available. It is to be understood that a similar operation, but in reverse order, takes place at the receiver side of ground terminal station 3.

In accordance with the present invention a multibeam, digitally-modulated, time division switched communication system is disclosed wherein the switching arrangement splits the frequency band of the input (up-link beams) and also possibly the output (down-link beams) from a repeater into several frequency multiplexed channels to decrease the bit rate through the repeater switching network and increase both the information handling capacity and reliability of the connection between any two ground terminal stations 3. The present communication system also controls the repeater switching network from the remote ground terminal stations 3 to reduce the memory required at repeater 1 while transmitting control information on a per channel basis on the input up-link channel. Additionally, the up-link signals include control information on each input channel to determine for its down-link channel which up-link input channel will be connected thereto.

The present system also includes a novel clock and frame synchronizing technique for permitting a plurality of up-link and down-link channels to be bit and frame synchronized at the remote repeater 1 and ground terminal stations 3 to permit simultaneous switching of the plurality of channels through the repeater.

It is to be understood that the above-described embodiments are simply illustrative of the principles of the invention. Various other modifications and changes may be made by those skilled in the art which will embody the principles of the invention and fall within the spirit and scope thereof.

What is claimed is:

1. In a multibeam digitally modulated, time division switched radio communication system including a plurality of ground terminal stations distributed among $n$ spaced ground station areas and a remote repeater, each ground terminal station comprising a transmitter, a receiver and a clock circuit for controlling the bit transmission frequency of the transmitter, the remote repeater comprising $n$ transponders, a master clock circuit for controlling the system transmissions, and a switching network comprising at least two $n \times n$ multiple access, time division, switching matrices, a method of synchronously switching the signals from the $n$ ground station areas through the repeater comprising the steps of:

(a) at the ground terminal stations within each ground station area, modulating a first and a second carrier wave with a first and a second digital bitstream, respectively, for transmission to the repeater, each bitstream being divided into frames with each frame being divided into a plurality of subframes, each subframe including a first section comprising control bits and a second section comprising the digital signal from at least one baseband communication channel, said first subframe section including a first portion comprising a unique digital code for identifying the start of each subframe, a second portion including a digital code for identifying each subframe within each frame, and a third portion including a digital code for controlling the repeater switching network;

(b) simultaneously generating at each of the $n$ transponders in response to signals from the repeater master clock a corresponding digital code for said first and second portions of said first subframe section in synchronism with the expected arrival of said first and second portion from the associated one of the $n$ station areas;

(c) demodulating to baseband frequencies at each of the $n$ transponders the two frequency multiplexed bitstreams received from the corresponding one of the $n$ ground station areas;

(d) comparing the digital codes generated in step (b) with the synchronous bits arriving in each of the demodulated bitstreams for determining whether the arriving first and second portions of each first subframe section are synchronous with and correspond to said transponder generated codes;

(e) generating at each transponder a first electrical signal when a match occurs in step (d); and (f) concurrently routing through separate sections of the repeater switching network to each transponder generating said first electrical signal the second subframe section received in a corresponding frequency multiplexed bitstream at the transponder indicated in the third portion of each of the synchronized first subframe sections for transmission to the ground terminal stations within the associated ground station area.

2. The method according to claim 1 comprising the additional step of:

(g) concurrent with performing step (b), transmitting to each associated ground terminal station both the transponder generated digital codes for said first and second portions of each first subframe section and an indication in a fourth portion of each first subframe section of the phase relationship between the received bitstream and the pulses generated by the repeater master clock.

3. The method according to claim 2 comprising the additional step of:

(h) causing the phase and frequency of the transmitter clock at each of the associated ground terminal stations to be altered in accordance with the indication received in said fourth portion of each first subframe section.

4. The method according to claim 1 comprising the additional steps of:

(g) in performing step (e), the additional result of generating at each transponder a second electrical signal in response to the occurrence of both a match between the transponder generated digital code for said first portion of each first subframe section and the synchronous bits received in each of the demodulated bitstreams and a mismatch between the transponder generated digital code for said second portion of each first subframe section and the synchronous bits received in each of the demodulated bitstreams; and (h) after step (g), retransmitting the remaining subframe signals received at the transponder back to the associated ground terminal station in response to said second electrical signal.

5. The method according to claim 1 comprising the additional step of:
  (g) in performing step (e), the additional result of generating at each transponder a second electrical signal in response to the occurrence of a mismatch between the transponder generated digital code for said first portion of each first subframe section and the synchronous bits received in each of the demodulated bitstreams; and
  (h) after step (g), transmitting back to the associated ground terminal stations during at least the second subframe section a clock signal comprising a predetermined pulse sequence generated from pulses from the repeater master clock in response to said second electrical signal for synchronizing the frequency of the associated ground terminal station clock circuit.

6. The method according to claim 5 wherein said clock signal comprises a string of pulses and no-pulses in alternating sequence.

7. In a multibeam, digitally modulated, time division switched radio communication system including a plurality of ground terminal stations distributed among $n$ spaced ground station areas and a remote repeater, each ground terminal station comprising a transmitter, a receiver and a clock circuit for controlling the bit transmission frequency of the transmitter, the remote repeater comprising $n$ transponders, and a master clock circuit for controlling the system transmissions, a method of synchronizing and switching the signals from the $n$ ground station areas through the repeater comprising the steps of:
  (a) generating at each transponder in response to signals from the repeater master clock a first and a second digital code in predetermined bits of a first section of a first repetitive digital subframe sequence with each subframe comprising $w$ bits, the first digital code providing an indication of the start of each subframe sequence and the second digital code providing an indication of the subframe number within a frame of s subframes;
  (b) generating at each ground terminal station for transmission to the repeater a series of N second digital synchronizing subframes, each subframe comprising $y$ bits, where $y$ is a submultiple of $w-1$, and including both a first section of comparative length to said first section of said first subframe sequence comprising said first and second digital codes in corresponding bits positions within said first section and a second section comprising a third digital code for sequentially identifying each of the second subframes within said series of N second subframes, the number of bits necessary for the first and second subframe series to be repeated being determined by the equation $$M \times sw = N \times y$$

where M is the number of frames of said first subframe series;
  (c) at each transponder, transmitting back to the associated ground terminal station a sequence of $w$ bits comprising the transponder generated digital codes for the first and second portions of said first subframe section followed by the received synchronizing subframe series in said second section whenever the transponder detects both a match between the transponder generated digital code for the first portion of each first subframe section and the synchronous bits in the received bitstream and a mismatch between the transponder generated digital code for the second portion of each first subframe section and the synchronous bits in the received bitstream;
  (d) determining at each ground terminal station from the signals received from the associated repeater transponder the number T of the first synchronizing subframe in said received second subframe section causing said repeater transmission in step (c) coincident with the normal reception at the repeater of the first subframe in said frame of $s$ subframes in the first subframe series in accordance with the digital code in the second portion of each first subframe section; and
  (e) incrementing a bit counter maintaining a count of the transmitted bits in the second subframe series by a value equal to $(N-t) \times y$ to effect frame and subframe synchronization at each ground terminal station.

8. A multibeam, time division, switched radio communication system for selectively interconnecting each of $m$ digitally-encoded baseband signals, which comprises
  a plurality of ground terminal stations distributed among $n$ spaced ground station terminals, each terminal comprising a transmitter and a receiver, each transmitter including means capable of generating a first and a second carrier wave, and means capable of modulating each of said first and second carrier waves with a separate quantity of $p$ of said digitally-encoded baseband signals, where $p = m/2n$, to generate an output signal comprising a first and a second digital bitstream divided into frames with each frame being divided into $s$ subframes, each subframe comprising a first control information section and a second intelligence information section including $p/s$ of said digitally encoded baseband signals; and
  a synchronizing repeater including a master digital clock for controlling the system transmissions and $n$ transponders capable of receiving the modulated first and second carrier waves from said $n$ ground station areas, respectively, each transponder including
  means capable of synchronously demodulating said first and second carrier waves to separately recover said first and second digital bitstream;
  means capable of generating a third carrier wave for transmission to the receivers in the corresponding ground station areas, and
  means capable of modulating said third carrier wave with $p'$ digitally-encoded baseband signals, where $p' = m/n$, for generating an output signal comprising a digital bitstream divided into frames with each frame being divided into subframes, said synchronizing repeater further comprising:
  a first and a second multiple-access time division $n \times n$ switching matrix synchronized with said master digital clock, for concurrently and selectively routing corresponding subframes in each of the $n$ demodulated first and second digital bitstreams, respectively, from the demodulating means in either one of the same and another transponder to the modulating means in the associated transponder in response to said first control information section in each of the corresponding subframes.

9. The multibeam, time-division, switched radio communication system according to claim 8 wherein
said first control information section in each subframe transmitted by each ground terminal station includes a first portion comprising a unique digital code for identifying the start of each subframe, a second portion including a digital codes for identifying each subframe within each frame, and a third portion including a digital code for controlling the repeater switching network;
each transponder further comprising
means capable of generating a corresponding digital code for the first and second portions of said first subframe section in synchronism with the expected arrival of said first and second portion in each subframe from the associated one of the n ground station areas in response to signals from the master digital clock; and
means capable of comparing the digital codes generated by said digital code generating means with the synchronous bits arriving in each of the demodulated bitstreams and generating a first electrical signal when the arriving first and second portions of each first subframe section are synchronous with, and correspond to, said transponder generated codes; and
said first and second switching matrices comprising means capable of concurrently routing through the first and second switching matrix to each transponder generating said first electrical signal the second subframe section received in the first and second digital bitstream, respectively, at the transponder indicated in the third portion of each of the synchronized first subframe sections.

10. The multibeam, time-division, switched radio communication system according to claim 9 wherein
each transponder further comprises means capable of transmitting to each associated ground terminal station both the transponder generated digital codes for said first and second portions of each first subframe section and an indication in a fourth portion of each first subframe section of the phase relationship between the received bitstream and the pulses generated by the repeater master clock.

11. The multibeam, time-division, switched radio communication system according to claim 10 wherein
each ground terminal station further comprises
a clock circuit for controlling the bit transmission rate of the transmitter; and
means capable of altering the phase and frequency of the clock circuit output signal in accordance with the indication received from the repeater in said fourth portion of each first subframe section.

12. The multibeam, time-division, switched radio communication system according to claim 8 wherein
said first control information section in each subframe transmitted by each ground terminal station includes a first portion comprising a unique digital code for identifying the start of each subframe, a second portion including a digital code for identifying each subframe within each frame, and a third portion including a digital code for controlling the repeater switching network;
each transponder further comprising
means capable of generating a corresponding digital code for said first and second portions of said first subframe section in synchronism with the expected arrival of said first and second portion in each subframe from the associated one of the n ground terminal stations in response to signals from the master digital clock;
means capable of comparing the digital codes generated by said digital code generating means with the synchronous bits arriving in each of the demodulated bitstreams and generating a first electrical signal when both a match occurs between the transponder generated digital code for said first portion of each first subframe section and the synchronous bits received in each of the demodulated bitstreams and a mismatch occurs between the transponder generated digital code for said second portion of each first subframe section and the synchronous bits received in each of the demodulated bitstreams; and
means capable of retransmitting the remaining subframe signal received at the transponder back to the associated ground station area in response to the generation of said first electrical signal.

13. The multibeam, time-division, switched radio communication system according to claim 8 wherein
said first control information section in each subframe transmitted by each ground terminal station includes a first portion comprising a unique digital code for identifying the start of each subframe;
each transponder further comprising
means capable of generating a corresponding digital code for said first portion of said first subframe section in synchronism with the expected arrival of said first portion in each subframe from the associated one of the n ground terminal stations in response to signals from the master digital clock;
means capable of comparing the digital codes generated by said digital code generating means with the synchronous bits arriving in each of the demodulated bitstreams and generating a first electrical signal when a mismatch occurs between the transponder generated digital code for said first portion of each first subframe section and the synchronous bits received in each of the demodulated bitstreams; and
means capable of transmitting back to the associated ground station area during at least the second subframe section a clock signal comprising a pulse sequence which is synchronous with the pulses of the repeater master digital clock in response to said first electrical signal for synchronizing the frequency of the associated ground terminal station clock circuit.

14. The multibeam, time-division, switched radio communication system according to claim 13 wherein said clock signal comprises a string of pulses and no-pulses in an alternating sequence.

15. The multibeam, time-division, switched radio communication system according to claim 8 wherein
said first control information section in each subframe transmitted by each ground terminal station includes a first portion comprising a unique digital code for identifying the start of each subframe, a second portion including a digital code for identifying each subframe within each frame, and a third portion including a digital code for controlling the repeater switching network;
each transponder further comprising
means capable of generating a corresponding digital code for the first and second portions of said first subframe section in synchronism with the expected arrival of said first and second portion in each subframe from the associated one of the $n$ ground station areas in response to signals from the master digital clock;

means capable of comparing the digital codes generated by said digital code generating means with the synchronous bits arriving in each of the demodulated bitstreams and generating either one of a first electrical signal when the arriving first and second portions of each first subframe section are synchronous with, and correspond to, said transponder generated codes, and a second electrical signal when both a match occurs between the transponder generated digital code for said first portion of each first subframe section and the synchronous bits received in each of the demodulated bitstreams and a mismatch occurs between the transponder generated digital code for second portion of each first subframe section and the synchronous bits received in each of the demodulated bitstreams; and means capable of either one of concurrently routing through the first and second switching matrix to each transponder generating said first electrical signal the second subframe section received in the first and second digital bitstream, respectively, at the transponder indicated in the third portion of each of the synchronized first subframe sections, and retransmitting the remaining subframe signal received at the transponder back to the associated ground terminal station in response to the generation of said second electrical signal.

16. In a multibeam, digitally modulated, time-division switched radio communication system wherein a plurality of ground terminal stations distributed among $n$ ground station areas communicate with each other through a remote repeater comprising $n$ transponders and a master clock circuit, synchronizing and switching circuitry comprising:

means for generating at each transponder in response to signals from the repeater master clock a first and a second digital code in predetermined bits of a first section of a first repetitive digital subframe sequence with each subframe comprising $w$ bits, the first digital code providing an indication of the start of each subframe sequence and the second digital code providing an indication of the subframe number within a frame of $s$ subframes;

means for generating at each ground terminal station for transmission to the repeater a series of N second digital synchronizing subframes, each subframe comprising $y$ bits, where $y$ is a submultiple of $w-1$, and including both a first section of comparative length to said first section of said first subframe sequence comprising said first and second digital codes in corresponding bits positions within said first section and a second section comprising a third digital code for sequentially identifying each of the second subframes within said series of N second subframes, the number of bits necessary for the first and second subframe series to be repeated being determined by the equation $$M \times sw = N \times y$$

where M is the number of frames of said first subframe series;

means at each transponder for transmitting back to the associated ground terminal station a sequence of $w$ bits comprising the transponder generated digital codes for the first and second portions of said first subframe section followed by the received synchronizing subframe series in said second section whenever the transponder detects both a match between the transponder generated digital code for the first portion of each first subframe section and the synchronous bits in the received bitstream and a mismatch between the transponder generated digital code for the second portion of each first subframe section and the synchronous bits in the received bitstream;

means for determining at each ground terminal station from the signals received from the associated repeater transponder transmitting means the number $t$ of the first synchronizing subframe in said received second subframe section which arrived coincident with the normal reception at the repeater of the first subframe in said frame of $s$ subframes in the first subframe series in accordance with the digital code in the second portion of each first subframe section; and means for incrementing a bit counter at each ground terminal station maintaining a count of the transmitted bits in the second subframe series by a value equal to $(N-t) \times y$ to effect frame and subframe synchronization at each ground terminal station.

17. In a multibeam, digitally modulated, time-division switched radio communication system wherein a plurality of ground terminal stations distributed among $n$ ground station area communicate with each other through a remote satellite repeater comprising a master clock circuit, an on-board repeater switching system comprising:

means capable of simultaneously receiving and demodulating the individual signals from the $n$ ground station areas, each signal comprising a first and a second frequency multiplexed channel, each channel comprising a bitstream which is divided into frames with each frame being divided into a plurality of subframes, each subframe including a first section comprising control bits and a second section comprising the digital signal from at least one baseband communication channel, said first subframe section including a first portion comprising a unique digital code for identifying the start of each subframe, a second portion including a digital code for identifying each subframe within each frame, and a third portion including a digital code for controlling the repeater switching network;

means capable of separately comparing the received digital codes for said first and second portions in each first subframe section of each of the received channels with corresponding signals generated by the master clock circuit, and generating a separate first electrical signal for each channel wherein the received digital codes for the first and second portions of each received subframe correspond and are in synchronism with the signals from the master clock circuit;

a switching network comprising at least two $n \times n$ multiple access, time division, switching matrices, capable of concurrently routing through separate matrices of the repeater switching network in response to said first electrical signals the second subframe section received in a corresponding frequency multiplexed channel from the ground station area indicated in the third portion of each of the synchronized first subframe sections; and transmitting means for transmitting the switched subframes to the destined ground station areas.

18. An on-board repeater switching system according to claim 17 wherein said comparing and generating means is further capable of generating a second electrical signal in response to the occurrence of both a match between the master clock circuit generated corresponding signals for said first portion of each first subframe section and the synchronous bits received in each of the demodulated bitstreams and a mismatch between the transponder generated corresponding signals for said second portion of each first subframe section and the synchronous bits received in each of the demodulated bitstreams; and the switching network is further capable of routing to the transmitting means the remaining subframe signal received at the receiving means for retransmission back to the associated ground terminal station in response to said second electrical signal.

* * * * *